United States Patent
Zavadsky et al.

(10) Patent No.: US 7,630,296 B2
(45) Date of Patent: Dec. 8, 2009

(54) SYSTEM AND METHOD FOR REMOTELY RESTORING INOPERATIVE DATA COMMUNICATIONS

(75) Inventors: Dean Zavadsky, Shakopee, MN (US);
Jeff Millar, Mount Vernon, NH (US);
Paul Schatz, Burnsville, MN (US);
Steve Stuart, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 292 days.

(21) Appl. No.: 11/279,772

(22) Filed: Apr. 14, 2006

(65) Prior Publication Data
US 2007/0242689 A1 Oct. 18, 2007

(51) Int. Cl.
*G04R 31/08* (2006.01)

(52) U.S. Cl. .................. 370/217; 370/218; 370/219; 370/220; 370/221; 398/1; 398/2; 398/3; 398/4; 398/5; 398/6; 398/7; 398/8; 398/9; 398/17

(58) Field of Classification Search .............. 370/217, 370/221, 218, 219, 220; 398/1–8, 17
See application file for complete search history.

(56) References Cited

U.S. PATENT DOCUMENTS

| 5,134,704 | A * | 7/1992 | Leuty .................. 714/18 |
| 5,136,410 | A * | 8/1992 | Heiling et al. .......... 398/15 |
| 6,483,616 | B1 * | 11/2002 | Maddocks et al. ........ 398/1 |
| 6,718,376 | B1 * | 4/2004 | Chu et al. ............ 709/223 |
| 7,248,797 | B2 * | 7/2007 | Forsberg .............. 398/15 |
| 2003/0161261 | A1 * | 8/2003 | Weis .................. 370/221 |
| 2004/0047554 | A1 * | 3/2004 | Forsberg .............. 385/31 |

* cited by examiner

*Primary Examiner*—Nick Corsaro
*Assistant Examiner*—Amanuel Lebassi
(74) *Attorney, Agent, or Firm*—Fogg & Powers LLC

(57) ABSTRACT

A method for remotely restoring inoperative data communications is disclosed. The method includes generating a predetermined sequence of signals at a first Communications unit. The method further includes keying an output of a transmitter on and off at the first communications unit with the predetermined sequence of signals and conveying a transmission of the predetermined sequence of signals to a second communications unit. The method also includes recognizing the predetermined sequence of signals at the second communications unit as indicative of inoperability of the second communications unit and, responsive to the recognized predetermined sequence of signals, outputting a signal to attempt to restore inoperative data communications at said second communications unit.

22 Claims, 1 Drawing Sheet

SYSTEM AND METHOD FOR REMOTELY RESTORING INOPERATIVE DATA COMMUNICATIONS

FIELD OF THE INVENTION

The present invention relates generally to the data communications field, and more specifically, but not exclusively, to a system and method for remotely restoring inoperative data communications.

BACKGROUND OF THE INVENTION

Data communication systems are used to transfer data from one location to another. In this regard, data communication systems generally include three components: a transmitter, a transmission medium or path, and a receiver. In two-way data communications, the transmitters and receivers can be combined (e.g., transceivers) to transmit and receive data simultaneously. Depending on the application involved, the transmission medium can be implemented in a number of ways. For example, data can be conveyed over twisted pairs (e.g., telephone wires), coaxial cables, wireless data links (e.g., microwave radio links, cellular radiotelephone links, satellite radio links, infrared data links), or lightwave transmission media (e.g., fiber optic cables).

A significant problem exists with today's data communication systems and designs. For example, with certain serial data transmission applications, if the physical link of the data communication system's transmission medium is connected and operable, but the system's receiver is unable to recover the incoming serial data (e.g., due to a problem in the data link layer on the receiver side), then a total loss of data communications over that medium can occur. Once the underlying data communication problem is resolved, the receiver can be manually reset at its location and data communications restored. However, in certain long distance data communication applications, the receiver can be located a significant distance away from the transmitter (e.g., 30 miles or more). Consequently, personnel have to be deployed to service and reset the receiver at the remote site. Unfortunately, this approach increases the downtime and also the operational and maintenance expenses of the system involved. Therefore, a pressing need exists for a system and method that can remotely restore inoperative data communications, without having to deploy personnel to a remote location to service and/or reset the receiver involved. As described in detail below, the present invention provides such a system and method, which resolve the above-described data communication problems and other related problems.

SUMMARY OF THE INVENTION

The present invention provides a system and method for remotely restoring inoperative data communications, by causing the transmitter to transmit over the physical link a predetermined sequence of signals that can be detected at the receiver. Responsive to the detected sequence of signals, the receiver can initiate an internal reset command to restore the communication of data. In accordance with a preferred embodiment of the present invention, a system for remotely restoring inoperative data communications is provided, which includes a first laser transceiver unit located in a head end, and a second laser transceiver unit remotely located in a node end, and an optical transmission medium connected between the head end and the node end. For this example embodiment, the head end is the host end of a distributed base station system for a cellular radiotelephone network, the node end includes the cellular transmitter/receiver (remote radio head) and antenna components, and the optical transmission medium is a fiber optic cable. The head end also includes a programmable logic device (PLD), which causes the transmitter section of the first laser transceiver to transmit over the fiber optic cable a predetermined sequence of signals if a loss of data communications has occurred. The node end also includes a PLD, which is coupled to the receiver section of the second laser transceiver to determine if the predetermined sequence of signals has been received. If so, the PLD in the node end outputs signals that initiate a reset of the node end involved. If the reset attempt fails to restore the communication of data, the PLD in the node end can cause the transmitter section of the second laser transceiver to transmit to the head end a second predetermined sequence of signals that represents node end diagnostic information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
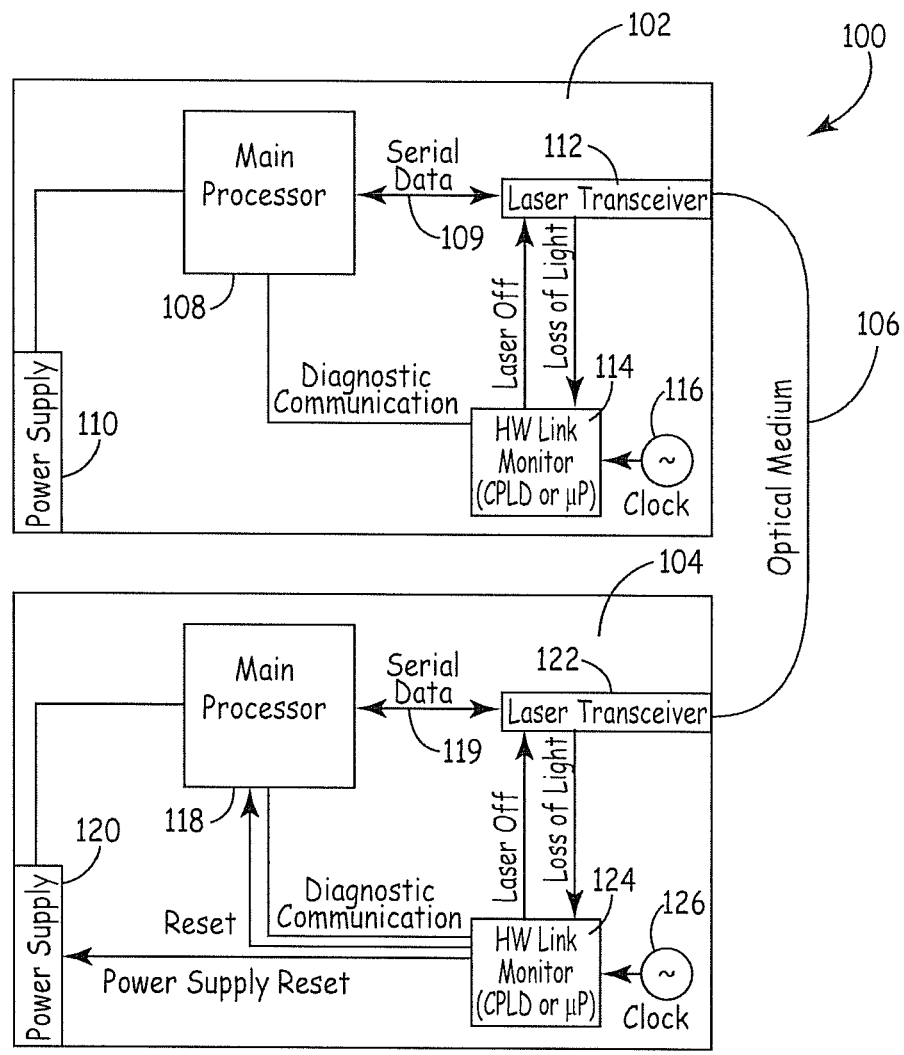
FIG. 1 depicts a schematic block diagram of an example system for remotely restoring inoperative data communications, which can be implemented in accordance with a preferred embodiment of the present invention.

With reference now to the figures, FIG. 1 depicts a schematic block diagram of an example system 100 for remotely restoring inoperative data communications, which can be implemented in accordance with a preferred embodiment of the present invention. As shown, system 100 includes a first communications unit 102 and a second communications unit 104. Communications units 102 and 104 are coupled together for data communications by an optical transmission medium 106. For this example embodiment, the first communications unit 102 is a head end for a cellular radiotelephone network, the second communications unit 104 is a node end for that network, and the optical transmission medium 106 is a single-mode or multi-mode fiber optic cable that provides a physical data communications link (e.g., on the physical layer) between the first and second communications units 102 and 104.

More specifically, for this example embodiment, first communications unit 102 includes a main processor unit 108 coupled by a serial data link 109 to a laser transceiver unit 112. A power supply unit 110 provides operating power for main processor unit 108 and other components of first communications unit 102. Main processor unit 108 is a suitable digital processor (e.g., microcontroller, microprocessor, embedded processor, computer processor, CPU, etc.) that functions, among other things, to execute the instructions of an operating system. For example, main processor unit 108 can be arranged as a single processor connected to a data communications bus or system bus. A memory controller/ cache can also be connected to the data communications bus or system bus, which can provide an interface between main processor unit 108 and a local memory (e.g., RAM, ROM, etc.). Also, for this example embodiment, the operating system includes a plurality of machine instructions stored in the local memory, which can be retrieved and operated on by main processor unit 108. An Input/Output (I/O) bus bridge can also be connected to the data communications bus or system bus, which can provide an interface between main processor unit 108 and an I/O bus. Thus, main processor unit 108 can receive, retrieve and/or send data via such an I/O bus. For example, main processor unit 108 can receive, retrieve and/or store system diagnostic information such as signal levels and call handoffs. Also, main processor unit 108 can send and receive data via serial data link 109. In any event, those of ordinary skill in the art will appreciate that the hardware described herein for main processor unit 108 in FIG. 1 may vary. As such, the depicted example is provided for illustrative purposes and not meant to imply any architectural limitations with respect to the present invention.

For this example embodiment, first communications unit 102 also includes a hardware link monitor unit 114 coupled to laser transceiver unit 112. Among other things, hardware link monitor unit 114 includes programmable logic circuitry that can be implemented with, for example, a Complex PLD (CPLD), a Simple PLD (SPLD), a Field-Programmable Gate Array (FPGA), or a suitable Application-Specific Integrated Circuit (ASIC) that can function to key the transmitter portion of laser transceiver unit 112 with a predetermined sequence of signals. Alternatively, hardware link monitor unit 114 can include a microprocessor or other suitable digital processor that can key the transmitter portion of laser transceiver unit 112. For example, the CPLD (or microprocessor, etc.) can be programmed to initiate keying of the optical transmitter with the predetermined sequence of signals automatically, if a feedback signal being input to the CPLD indicates that a certain data communication problem has occurred. As an alternative, the CPLD can initiate keying of the optical transmitter in response to a user's input command. For this embodiment, the data communications between first and second communications units 102 and 104 is bi-directional. Consequently, the CPLD can be programmed to recognize and respond to the predetermined sequence of signals, if the receiver portion of laser transceiver unit 112 detects such signals on optical transmission medium 106.

The hardware link monitor unit 114 (e.g., synchronized by clock 116) detects whether or not the transmitter portion (e.g., light source) of laser transceiver unit 112 is emitting/transmitting light signals. If hardware link monitor unit 114 detects a loss of light transmissions, hardware link monitor unit 114 sends a message over a diagnostic communication link to main processor unit 108, which indicates the loss of light transmissions to main processor unit 108. Alternatively, hardware link monitor unit 114 can send a command to turn off the transmitter portion of laser transceiver unit 112, in response to a signal from main processor unit 108 sent via the diagnostic communication link.

For this example embodiment, the structure and operation of second communications unit 104 is similar to that of the above-described first communications unit 102. Specifically, second communications unit 104 includes a main processor unit 118 coupled by a serial data link 119 to a laser transceiver unit 122. A power supply unit 120 provides operating power for main processor unit 118 and other components of second communications unit 104. Main processor unit 118 can receive, retrieve and/or store system diagnostic information such as signal levels and call handoffs. Also, main processor unit 118 can send and receive data via serial data link 119.

For this example embodiment, second communications unit 104 also includes a hardware link monitor unit 124 coupled to laser transceiver unit 122. Among other things, hardware link monitor unit 124 also includes programmable logic circuitry or a suitable digital processor (e.g., microprocessor, etc.) that can perform the functions of the programmable logic circuitry. Similar to the programmable circuitry (e.g., CPLD) included in hardware link monitor unit 114 in first communications unit 102, the programmable circuitry included in hardware link monitor unit 124 can be implemented with, for example, a CPLD, SPLD, FPGA, or suitable ASIC. However, in this case, the primary function of the CPLD in hardware link monitor unit 124 is to recognize and respond to a detection of the predetermined sequence of signals by the receiver portion of laser transceiver unit 122. For example, the CPLD in hardware link monitor unit 124 can be programmed to initiate a reset of one or more components of second communications unit 104, if this CPLD receives the predetermined sequence of signals from the light detector section of laser transceiver unit 122. Again, for this example embodiment, the data communications between first and second communications units 102 and 104 is bi-directional. Consequently, the CPLD in hardware link monitor unit 124 can also be programmed to key the transmitter portion of laser transceiver unit 122 with the predetermined sequence of signals, if the user's intent is to remotely reset one or more components of first communications unit 102.

Similar to hardware link monitor unit 114 of first communications unit 102, hardware link monitor unit 124 (e.g., synchronized by clock 126) detects whether or not the transmitter portion (e.g., light source) of laser transceiver unit 122 is emitting/transmitting light signals. If hardware link monitor unit 124 detects a loss of light transmissions, hardware link monitor unit 124 sends a message over a diagnostic communication link to main processor unit 108, which indicates the loss of light transmissions to main processor unit 108. Also, if required, hardware link monitor unit 124 can send a power supply reset command to power supply unit 120 over a power supply reset link. Alternatively, hardware link monitor unit 124 can send a command to turn off the transmitter portion of laser transceiver unit 122, in response to a signal from main processor unit 118 sent via the diagnostic communication link. Also, hardware link monitor unit 124 can reset the main processor unit 118 and any other component of second communications unit 104.

For this example embodiment, optical transmission medium 106 is a fiber optic cable. At first communications unit 102, the fiber optic cable (106) is connected (e.g., with a suitable optical connector) to the output of the transmitter portion of laser transceiver unit 112 and the input of the receiver portion of laser transceiver 112. At second communications unit 104, the fiber optic cable (106) is connected to the input of the receiver portion of laser transceiver 122 and the output of the transmitter portion of laser transceiver unit 122. As such, the fiber optic cable (106) can be implemented with a single mode or multi-mode fiber optic cable, or a plastic optical fiber.

In normal operation, high-speed data (e.g., cellular telephone speech data) to be communicated from first communications unit 102 to second communications unit 104 is sent from main processor unit 108 via serial data link 109 to the transmitter portion of laser transceiver unit 112. The transmitter processes and translates that data into synchronous coded light pulses. An injection-laser diode or other suitable light source generates the light pulses, which are funneled with suitable optical lenses into the optical transmission medium (fiber optic cable) 106. At second communications unit 104, the pulsed light signals on optical transmission medium 106 are detected by a light sensitive device in the receiver portion of laser transceiver unit 122, converted to digital signals, and conveyed in serial form to main processor 118 via serial data link 119. Notably, it should be readily understood that for bi-directional data communications, the roles of the components in first communications unit 102 and second communications unit 104 can be reversed, and high-speed data can be transmitted from second communications unit 104 via optical transmission medium 106, and received and/or detected at first communications unit 102.

Essentially, in accordance with key principles of the present invention, if a data communication problem occurs (e.g., data link layer is inoperable, etc.) in second communications unit 104, but the physical data link (e.g., optical transmission medium 106) is still connected and operable, then the first communications unit 102 can be used to remotely restore data communications operations in second communications unit 104. Also, given similar operating conditions, if the data communications is bidirectional and a data communications problem occurs in first communications unit 102, the second communications unit 104 can be used to remotely restore data communications operations in first communications unit 102. Additionally, in accordance with principles of the present invention, if such a data communication problem occurs, but the physical data link is still connected and operable, then diagnostic information (and/or other relevant information) can be conveyed from one communications unit to the other.

Specifically, these principles of the present invention are illustrated by referring to system 100 of the example embodiment shown in FIG. 1. Assume that the physical data link (e.g., optical transmission medium 106) is properly connected between first communications unit 102 and second communications unit 104, and a data communications problem has occurred. For example, a component of the data link layer is inoperable in second communications unit 104, a software application error has occurred in main processor unit 118, or power supply unit 120 has become inoperative (e.g., tripped a breaker). The CPLD in hardware link monitor unit 114 is programmed to generate a predetermined sequence of signals that (e.g., asynchronously) key the transmitter portion of laser transceiver 112. As such, the predetermined sequence of signals can be a pattern of signals that are unlikely to occur randomly, at a rate that is orders of magnitude slower than the transmitter's normal operating frequency, and are also not part of a known data communications protocol. The predetermined sequence of signals cause the light source of transceiver unit 112 to output corresponding signals with power levels that are greater than or equal to a predetermined threshold power level. Alternatively, for example, the predetermined sequence of signals can key the light source of laser transceiver unit 112 on and off (e.g., ones and zeros) in accordance with the signal pattern used. For example, the light source for transceiver unit 112 can be pulsed on and off by the predetermined sequence of signals, or the light source can transmit continuously and the carrier can be modulated by the predetermined sequence of signals. Thus, the signal pattern for the predetermined sequence of signals is conveyed as light transmissions via optical transmission medium (e.g., fiber optic cable) 106 from first communications unit 102 to second communications unit 104.

For this example embodiment, the signal pattern for the predetermined sequence of signals transmitted on optical transmission medium 106 is detected and converted to electrical signals by the light sensitive detector device of the receiver portion of laser transceiver unit 122 in second communications unit 104. These electrical signals are coupled to the CPLD in hardware link monitor unit 124, which is programmed to recognize and respond to the predetermined sequence of signals received. For example, responsive to the particular predetermined sequence of signals received, the CPLD in hardware link monitor unit 124 can output a suitable signal that causes second communications unit 104 to initiate an internal reset command that can restore the communications of the high-speed serial data between first and second communications units 102 and 104. If the remote reset attempt fails to restore the data communications between the two communications units, then second communications unit 104 can send a different predetermined sequence of signals (asynchronously) to first communications unit 102 that provides certain diagnostic information related to the data communications problem. In other words, the present invention provides a low speed data link that can be used to initiate a reset command to restore communications for a communications unit at a remote location, or provide information from the remote location about the data communications failure involved.

Figure 2:
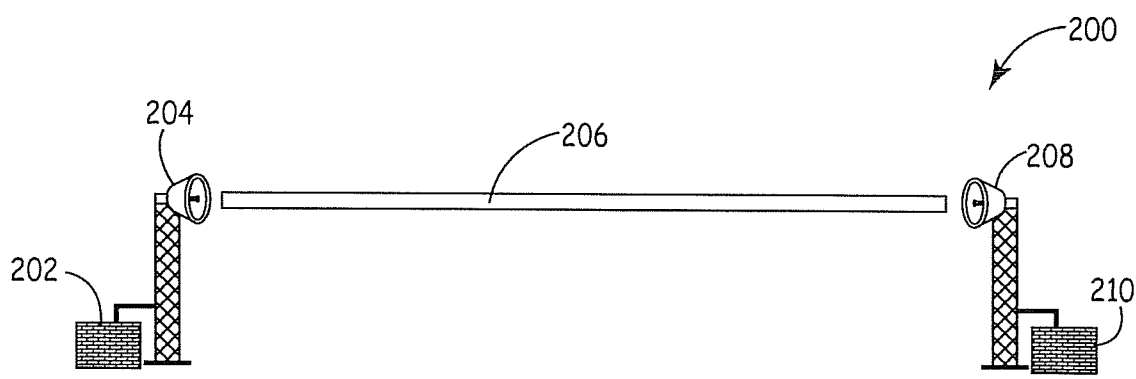
FIG. 2 depicts a pictorial representation of an example system for remotely restoring inoperative data communications, which further illustrates principles of the present invention.

FIG. 2 depicts a pictorial representation of an example system 200 for remotely restoring inoperative data communications, which further illustrates principles of the present invention. For this illustrative embodiment, system 200 represents a microwave radio transmission system, which includes a first microwave transceiver unit 202, an associated first transmit/receive antenna 204, a second microwave transceiver unit 210, and an associated second transmit/receive antenna 208. Each microwave transceiver unit 202 and 210 includes a PLD (or similar logic circuitry, microprocessor, etc.) that is functionally similar to the two CPLDs shown in FIG. 1. The transmission medium for data communications between first microwave transceiver unit 202 and second microwave transceiver unit 210 is a microwave radio transmission link 206. Essentially, system 200 illustrates that the principles of the present invention can also be applied to wireless data communications systems.

Specifically, for this example embodiment, it may be assumed that the components of the physical link (e.g., transceivers and associated antenna components) for system 200 are operable, and a data communications problem (e.g., failure in the data link layer, software glitch, or other problem not associated with the physical transmission link) has occurred in second transceiver unit 210. The PLD circuitry in first transceiver unit 202 outputs a predetermined sequence of (low-speed asynchronous) signals that key the transmitter portion of first transceiver unit 202 on and off with the signal pattern involved. Alternatively, the transmitter portion of first transceiver unit 202 can be continuously transmitting, and the predetermined sequence of signals can be used to modulate the carrier with the low-speed signal pattern involved. In any event, the predetermined sequence of signals transmitted from antenna 204 (over radio link 206) is received and detected by the receiver portion of second transceiver unit 210. The PLD circuitry in second transceiver unit 210 is coupled to the receiver portion of second transceiver unit 210 and programmed to recognize and respond to the predetermined sequence of signals. Responsive to the predetermined sequence of signals received, the PLD circuitry in second transceiver unit 210 can output suitable signals to initiate an internal reset of second transceiver unit 210 in an attempt to restore the high-speed communications between first and second transceiver units 202 and 210. If the attempt to remotely reset second transceiver unit 210 fails, then second transceiver unit 210 can send a different predetermined sequence of signals (asynchronously) to first transceiver unit 202 that provides certain diagnostic information related to the data communications problem. Again, similar to the optical transmission case, the present invention provides a low speed data link over a (wireless) transmission medium that can be used to initiate a reset command to restore communications for a communications unit at a remote location, or provide information from the remote location about the data communications failure involved.

It is important to note that while the present invention has been described in the context of a fully functioning system for remotely restoring inoperative data communications, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular system for remotely restoring inoperative data communications.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated. communications receiving unit and said second data communications transmitting unit comprises a second transceiver, and the data communications is bidirectional.

What is claimed is:

1. A system for remotely restoring inoperative data communications, comprising:
    a first communications unit comprising:
        a data communications transmitting unit;
    a second communications unit comprising:
        a data communications receiving unit;
    a transmission medium coupled to said data communications transmitting unit and said data communications receiving unit;
    said first communications unit further comprising:
        a first logic circuit coupled to said data communications transmitting unit, said first logic circuit operable to generate a predetermined sequence of signals that key an output of said data communications transmitting unit on and off to send said predetermined sequence of signals over said transmission medium; and said second communications unit further comprising:
        a second logic circuit coupled to said data communications receiving unit, said second logic circuit configured to recognize said predetermined sequence of signals as indicative of inoperability of said second communications unit and output a signal to attempt to restore said second communications unit, if said predetermined sequence of signals is detected at said data communications receiving unit.

2. The system of claim 1,
    wherein said second communications unit further comprises:
        a second data communications transmitting unit coupled to said data communications receiving unit and said second logic circuit, said second logic circuit operable to generate a second predetermined sequence of signals, and said second data communications transmitting unit operable to transmit over said transmission medium responsive to said second predetermined sequence of signals; and
    wherein said first communications unit further comprises:
        a second data communications receiving unit coupled to said data communications transmitting unit and said first logic circuit, said first logic circuit operable to recognize said second predetermined sequence of signals, if said second predetermined sequence of signals is detected at said second data communications receiving unit.

3. The system of claim 1, wherein said transmission medium comprises an optical transmission medium.

4. The system of claim 1, wherein said transmission medium comprises a fiber optic cable, said data communications transmitting unit comprises a laser transmitter, and said data communications receiving unit comprises a laser receiver.

5. The system of claim 1, wherein said data communications transmitting unit comprises a data communications transmitter for a head end of a remote radio head, and the data communications receiving unit comprises a data communications receiver for a node end of said remote radio head.

6. The system of claim 2, wherein said data communications transmitting unit and said second data communications receiving unit comprise a first transceiver, said data communications receiving unit and said second data communications transmitting unit comprises a second transceiver, and the data communications is bi-directional.

7. The system of claim 1, wherein said transmission medium comprises a wireless radio link, said data communications transmitting unit comprises a wireless radio transmitter, and said data communications receiving unit comprises a wireless radio receiver.

8. The system of claim 1, wherein said transmission medium comprises at least one of a twisted pair, coaxial cable, microwave radio link, cellular radiotelephone link, satellite radio link, infrared data link, and lightwave communications link.

9. The system of claim 1, wherein said predetermined sequence of signals comprises a low-speed sequence of signals.

10. The system of claim 1, wherein said first logic circuit and second logic circuit comprise a respective digital processor.

11. The system of claim 1, wherein said first logic circuit and said second logic circuit respectively comprise at least one of a programmable logic circuit, PLD, CPLD, SPLD, FPGA and ASIC.

12. A system for remotely restoring inoperative data communications, comprising:
    a first communications unit comprising:
        means for transmitting data;
    a second communications unit comprising:
        means for receiving said data;

means for conveying said data from said means for transmitting data to said means for receiving said data;
said first communications unit further comprising:
  means for keying an output of said means for transmitting data on and off in accordance with a predetermined sequence of signals; and
said second communications unit further comprising:
  means for recognizing said predetermined sequence of signals as indicative of inoperability of said second communications unit and outputting a signal to attempt to restore said second communications unit, if said predetermined sequence of signals is detected at said means for receiving data.

13. The system of claim 12,
wherein said second communications unit further comprises:
  second means for transmitting data coupled to said means for receiving data;
wherein said first communications unit further comprises:
  second means for receiving data coupled to said means for transmitting data;
wherein said second communications unit further comprises:
  means for generating a second predetermined sequence of signals; and
wherein said first communications unit further comprises:
  means for recognizing said second predetermined sequence of signals, if said second predetermined sequence of signals is detected at said second means for receiving data.

14. The system of claim 12, wherein said means for conveying said data comprises a fiber optic cable.

15. The system of claim 13, wherein said means for transmitting data and said second means for receiving data comprises a first transceiver, and said means for receiving data and said second means for transmitting data comprise a second transceiver.

16. The system of claim 12, wherein said means for generating and said means for recognizing comprise at least one of a respective programmable logic circuit or a digital processor.

17. A method for remotely restoring inoperative data communications, comprising the steps of:
  generating a predetermined sequence of signals at a first communications unit;
  keying an output of a transmitter on and off at said first communications unit with said predetermined sequence of signals;
  conveying a transmission of said predetermined sequence of signals to a second communications unit;
  recognizing said predetermined sequence of signals at said second communications unit as indicative of inoperability of said second communications unit; and
  responsive to said recognized predetermined sequence of signals, outputting a signal to attempt to restore inoperative data communications at said second communications unit.

18. The method of claim 17, farther comprising the steps of:
  generating a second predetermined sequence of signals at said second communications unit;
  keying a transmitter at said second communications unit with said second predetermined sequence of signals;
  conveying a transmission of said second predetermined sequence of signals to said first communications unit;
  recognizing said second predetermined sequence of signals at said first communications unit; and
  responsive to said recognized second predetermined sequence of signals, outputting at least one signal associated with said inoperative data communications at said second communications unit.

19. The method of claim 18, wherein said at least one signal comprises diagnostic information associated with said inoperative data communications at said second communications unit.

20. The method of claim 1, wherein the first logic circuit is configured to determine whether said second communications unit is inoperable and generate and transmit said predetermined sequence of signals when said second communications unit is determined to be inoperable.

21. The method of claim 12, wherein said first communications unit further comprises:
  means for determining whether said second communications unit is inoperable; and
  wherein said means for generating generates said predetermined sequence of signals when said second communications unit is determined to be inoperable.

22. The method of claim 17, further comprising:
  determining whether said second communications unit is inoperable; and
  generating said predetermined sequence of signals when said second communications unit is determined to be inoperable.

* * * * *